US007727937B2

(12) United States Patent  
Pauls et al.

(10) Patent No.: US 7,727,937 B2  
(45) Date of Patent: *Jun. 1, 2010

(54) ACIDIC TREATMENT FLUIDS COMPRISING XANTHAN AND ASSOCIATED METHODS

(75) Inventors: Richard W. Pauls, Duncan, OK (US); Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/891,542

(22) Filed: Aug. 10, 2007

(65) Prior Publication Data

US 2007/0281868 A1   Dec. 6, 2007

Related U.S. Application Data

(63) Continuation-in-part of application No. 10/889,860, filed on Jul. 13, 2004, now abandoned, and a continuation-in-part of application No. 11/118,028, filed on Apr. 29, 2005, now Pat. No. 7,621,334, and a continuation-in-part of application No. 11/117,959, filed on Apr. 29, 2005, now Pat. No. 7,547,665.

(51) Int. Cl.
*C09K 8/60* (2006.01)
*E21B 43/16* (2006.01)

(52) U.S. Cl. ............... 507/213; 166/305.1; 166/308.2; 507/209; 507/211

(58) Field of Classification Search ............... 507/213, 507/211, 209; 166/305.1, 308.1, 308.2
See application file for complete search history.

(56) References Cited

U.S. PATENT DOCUMENTS

| | | | |
|---|---|---|---|
| 4,010,071 A | 3/1977 | Colegrove | 435/72 |
| 4,265,673 A | 5/1981 | Pace et al. | 106/175.1 |
| 4,299,825 A | 11/1981 | Lee | 514/54 |
| 4,887,670 A | 12/1989 | Lord et al. | 166/281 |
| 5,373,901 A | 12/1994 | Norman et al. | 166/300 |
| 5,458,197 A | 10/1995 | Chan | 166/304 |
| 5,723,416 A | 3/1998 | Liao | 507/110 |
| 5,759,964 A | 6/1998 | Shuchart et al. | 507/209 |
| 5,785,747 A | 7/1998 | Vollmer et al. | 106/194.2 |
| 5,799,734 A | 9/1998 | Norman et al. | 166/278 |
| 5,916,849 A | 6/1999 | House | 507/110 |
| 5,977,030 A | 11/1999 | House | 507/110 |
| 5,996,694 A | 12/1999 | Dewprashad et al. | 166/294 |
| 6,100,222 A | 8/2000 | Vollmer et al. | 507/113 |
| 6,110,875 A | 8/2000 | Tjon-Joe-Pin et al. | 507/201 |
| 6,123,159 A | 9/2000 | Brookey et al. | 175/72 |
| 6,148,917 A | 11/2000 | Brookey et al. | 166/301 |
| 6,302,209 B1 | 10/2001 | Thompson et al. | 166/305.1 |
| 6,315,045 B1 | 11/2001 | Brezinski | 166/300 |
| 6,422,326 B1 | 7/2002 | Brookey et al. | 175/72 |
| 6,444,316 B1 | 9/2002 | Reddy et al. | 428/407 |
| 6,488,091 B1 | 12/2002 | Weaver et al. | 166/300 |
| 6,525,011 B2 | 2/2003 | Brezinski | 510/253 |
| 6,527,051 B1 | 3/2003 | Reddy et al. | 166/300 |
| 6,534,448 B1 | 3/2003 | Brezinski | 507/90 |
| 6,547,871 B2 | 4/2003 | Chatterji et al. | 106/672 |
| 6,554,071 B1 | 4/2003 | Reddy et al. | 166/293 |
| 6,566,310 B2 | 5/2003 | Chan | 507/211 |
| 6,640,898 B2 | 11/2003 | Lord et al. | 166/300 |
| 6,706,668 B2 | 3/2004 | Brezinski | 507/269 |
| 6,767,869 B2 | 7/2004 | DiLullo et al. | |
| 6,806,235 B1 | 10/2004 | Mueller et al. | 507/138 |
| 6,877,563 B2 | 4/2005 | Todd et al. | 166/312 |
| 6,987,083 B2 | 1/2006 | Phillippi et al. | 507/213 |
| 7,021,383 B2 | 4/2006 | Todd et al. | 166/307 |
| 7,159,659 B2 | 1/2007 | Welton et al. | 166/307 |
| 7,195,068 B2 | 3/2007 | Todd | |
| 7,299,876 B2 | 11/2007 | Lord et al. | |
| 7,345,013 B2 | 3/2008 | Fraser | |
| 7,353,876 B2 | 4/2008 | Savery et al. | |
| 7,353,879 B2 | 4/2008 | Todd et al. | |
| 7,413,017 B2 | 8/2008 | Nguyen et al. | |
| 7,448,450 B2 | 11/2008 | Luke et al. | |
| 7,455,112 B2 | 11/2008 | Moorehead et al. | |
| 7,461,697 B2 | 12/2008 | Todd et al. | |
| 7,475,728 B2 | 1/2009 | Pauls et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |

(Continued)

FOREIGN PATENT DOCUMENTS

EP   1 617 039 A1   1/2006

(Continued)

OTHER PUBLICATIONS

Biopolymers in Salt Solutions Technical Bulletin, Kelco Oil Filed Group, Houston, TX, 2001, 3 pages.*

(Continued)

*Primary Examiner*—Timothy J. Kugel
(74) *Attorney, Agent, or Firm*—Robert A. Kent

(57) ABSTRACT

Acidic treatment fluids used in industrial and/or subterranean operations, and more particularly, acidic treatment fluids comprising clarified xanthan gelling agents, and methods of use in industrial and/or subterranean operations, are provided. In one embodiment, the acidic treatment fluids comprise an aqueous base fluid, an acid, and a gelling agent comprising clarified xanthan.

20 Claims, 2 Drawing Sheets

U.S. PATENT DOCUMENTS

| | | |
|---|---|---|
| 7,506,689 B2 | 3/2009 | Surjaatmadja et al. |
| 7,547,665 B2 | 6/2009 | Welton et al. |
| 7,595,280 B2 | 9/2009 | Welton et al. |
| 7,598,208 B2 | 10/2009 | Todd |
| 7,608,566 B2 | 10/2009 | Saini et al. |
| 7,608,567 B2 | 10/2009 | Saini |
| 2001/0016562 A1 | 8/2001 | Muir et al. .................. 507/201 |
| 2001/0027880 A1 | 10/2001 | Brookey ...................... 175/65 |
| 2002/0031525 A1 | 3/2002 | Kobzeff et al. ......... 424/195.18 |
| 2002/0092652 A1 | 7/2002 | Chatterji et al. ............. 166/308 |
| 2003/0166472 A1 | 9/2003 | Pursley et al. ............... 507/200 |
| 2003/0236174 A1 | 12/2003 | Fu et al. ..................... 507/200 |
| 2004/0023812 A1 | 2/2004 | England et al. ............. 507/100 |
| 2004/0129459 A1 | 7/2004 | Guichard et al. .............. 175/65 |
| 2004/0138069 A1* | 7/2004 | Kakadjian et al. ........... 507/111 |
| 2004/0206498 A1 | 10/2004 | Phillippi et al. ............. 166/278 |
| 2004/0216882 A1 | 11/2004 | Horton et al. ............ 166/305.1 |
| 2004/0238169 A1 | 12/2004 | Todd et al. ............... 166/280.2 |
| 2005/0000734 A1 | 1/2005 | Getzlaf et al. ................. 175/73 |
| 2005/0028978 A1 | 2/2005 | Parlar et al. ................. 166/278 |
| 2005/0261138 A1 | 11/2005 | Robb et al. |
| 2006/0014648 A1 | 1/2006 | Milson et al. ............... 507/213 |
| 2006/0032636 A1 | 2/2006 | Lord et al. ............... 166/308.2 |
| 2006/0054324 A1 | 3/2006 | Sullivan et al. |
| 2006/0108150 A1 | 5/2006 | Luke et al. .................... 175/64 |
| 2006/0144592 A1 | 7/2006 | Hanes et al. ................ 166/279 |
| 2006/0166836 A1 | 7/2006 | Pena et al. |
| 2006/0169448 A1 | 8/2006 | Savery et al. |
| 2006/0169452 A1 | 8/2006 | Savery et al. |
| 2006/0169453 A1 | 8/2006 | Savery et al. |
| 2006/0172893 A1 | 8/2006 | Todd et al. |
| 2006/0180309 A1 | 8/2006 | Welton et al. ............... 166/282 |
| 2006/0180310 A1 | 8/2006 | Welton et al. ............... 166/283 |
| 2006/0183646 A1 | 8/2006 | Welton et al. ............... 507/259 |
| 2006/0205608 A1 | 9/2006 | Todd |
| 2006/0234873 A1 | 10/2006 | Ballard ....................... 507/211 |
| 2006/0243449 A1 | 11/2006 | Welton et al. |
| 2006/0247135 A1 | 11/2006 | Welton et al. ............... 507/213 |
| 2006/0254774 A1 | 11/2006 | Saini et al. |
| 2006/0278437 A1 | 12/2006 | Guichard et al. .............. 175/65 |
| 2007/0042912 A1 | 2/2007 | Welton et al. |
| 2007/0049501 A1 | 3/2007 | Saini et al. |
| 2007/0066492 A1 | 3/2007 | Funkhouser et al. |
| 2007/0066493 A1 | 3/2007 | Funkhouser et al. |
| 2007/0078063 A1 | 4/2007 | Munoz, Jr. |
| 2007/0078064 A1 | 4/2007 | Munoz et al. |
| 2007/0238623 A1 | 10/2007 | Saini et al. |
| 2008/0026955 A1 | 1/2008 | Munoz et al. |
| 2008/0026959 A1 | 1/2008 | Munoz et al. |
| 2008/0026960 A1 | 1/2008 | Munoz et al. |
| 2008/0027157 A1 | 1/2008 | Munoz et al. |
| 2008/0039347 A1* | 2/2008 | Welton et al. ............... 507/213 |
| 2008/0070810 A1 | 3/2008 | Mang |
| 2008/0078545 A1 | 4/2008 | Welton et al. ............... 166/278 |
| 2008/0139415 A1 | 6/2008 | Todd et al. |
| 2008/0169102 A1 | 7/2008 | Carbajal et al. |
| 2008/0202759 A1* | 8/2008 | Welton .................... 166/308.5 |
| 2008/0207470 A1* | 8/2008 | Welton ....................... 507/209 |
| 2009/0042750 A1* | 2/2009 | Pauls et al. ................. 507/213 |
| 2009/0062157 A1 | 3/2009 | Munoz et al. |
| 2009/0258798 A1 | 10/2009 | Munoz |

FOREIGN PATENT DOCUMENTS

| | | |
|---|---|---|
| GB | 2354541 A | 3/2001 |
| JP | 2004181820 A | 7/2004 |
| WO | WO 95/12741 | 5/1995 |

OTHER PUBLICATIONS

Xanvis Material Safety Data Sheet, QMAX Solutions, Calgary, Alberta, Feb. 2007, 4 pages.*
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.
Office Action dated Jun. 12, 2008 from U.S. Appl. No. 11/118,028.
Office Action for U.S. Appl. No. 11/118,028, dated Dec. 8, 2008.
Office Action for U.S. Appl. No. 11/117,959, dated Dec. 10, 2008.
Written Opinion and Search Report for International Application No. PCT/GB2008/002698, Aug. 8, 2008.
Notice of Allowance and Notice of Allowance and Notice of Allowability for U.S. Appl. No. 11/118,028, dated Jul. 15, 2009.
Foreign Counterpart Search Report Application No. 05254386.5, Nov. 28, 2005.
Notice of Allowance and Notice of Allowability from U.S. Appl. No. 11/117,959, dated Apr. 21, 2009.
Office Action for U.S. Appl. No. 11/891,538, dated Sep. 23, 2009.
Notice of Allowance for U.S. Appl. No. 11/891,538 dated Mar. 30, 2010.

* cited by examiner

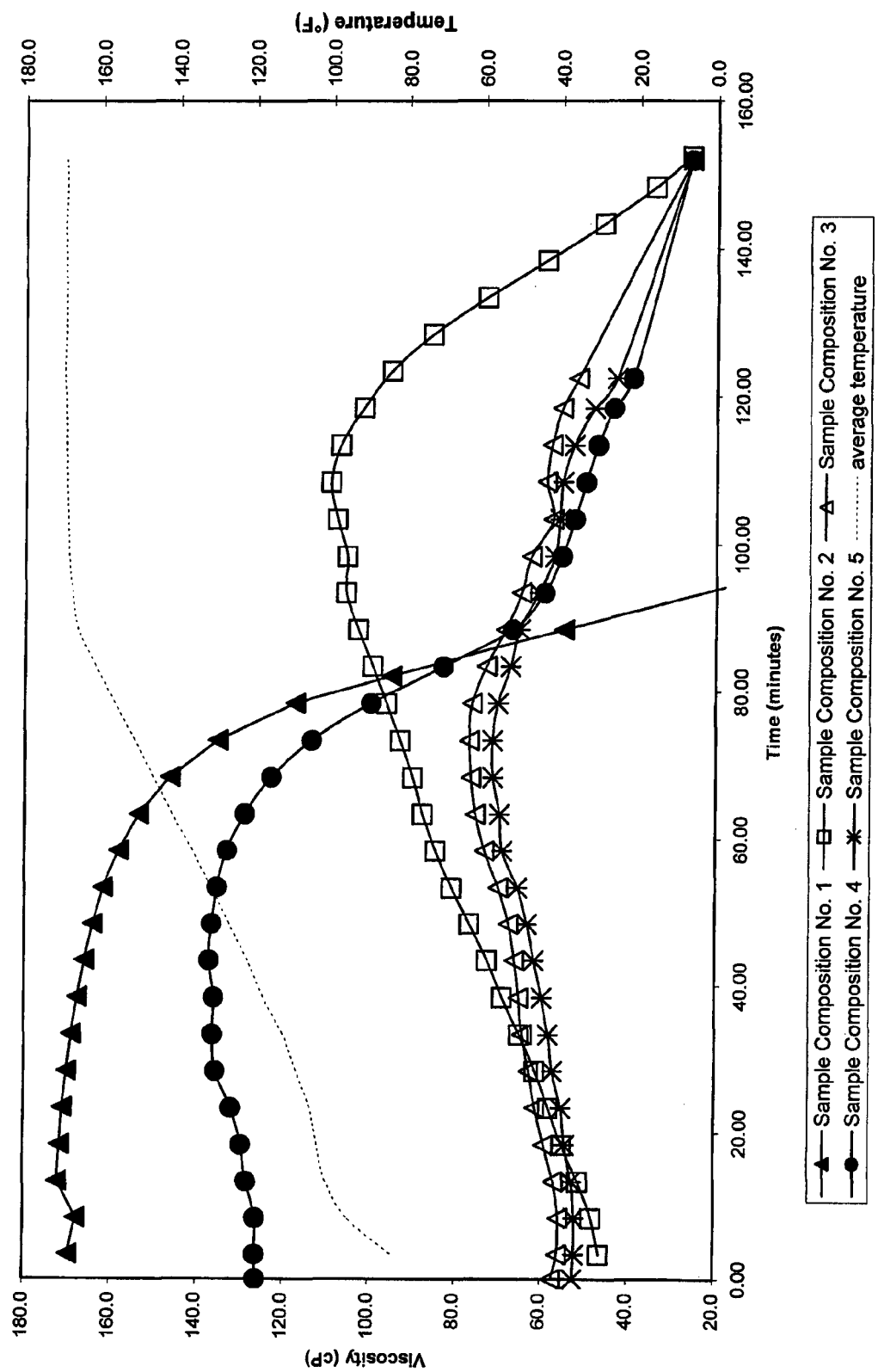

ACIDIC TREATMENT FLUIDS COMPRISING XANTHAN AND ASSOCIATED METHODS

CROSS-REFERENCE TO RELATED APPLICATIONS

The present application is related to co-pending U.S. application Ser. No. 11/891,538 entitled "Acidic Treatment Fluids Comprising Xanthan and Associated Methods," filed concurrently herewith, and is a continuation-in-part of U.S. application Ser. No. 10/889,860 filed on Jul. 13, 2004, now abandoned, and of U.S. application Ser. No. 11/118,028 filed on Apr. 29, 2005, now U.S. Pat. No. 7,621,334, and of U.S. application Ser. No. 11/117,959 filed on Apr. 29, 2005, now U.S. Pat. No. 7,547,665, the entire disclosures of which are incorporated herein by reference

BACKGROUND

The present invention relates to acidic treatment fluids used in industrial and/or subterranean operations, and more particularly, to acidic treatment fluids comprising clarified xanthan gelling agents, and methods of use in industrial and/or subterranean operations.

Acidizing and fracturing procedures using acidic treatment fluids are commonly carried out in subterranean well formations to accomplish a number of purposes including, but not limited to, to facilitate the recovery of desirable hydrocarbons from the formation. As used herein, the term "treatment fluid" refers to any fluid that may be used in a subterranean application in conjunction with a desired function and/or for a desired purpose. The term "treatment fluid" does not imply any particular action by the fluid or any component thereof.

One commonly used aqueous acidic treatment fluid comprises hydrochloric acid. Other commonly used acids for acidic treatment fluids include hydrofluoric acid, acetic acid, formic acid, citric acid, ethylene diamine tetra acetic acid ("EDTA"), glycolic acid, sulfamic acid, and derivatives or combinations thereof.

Acidic treatment fluids are used in various subterranean operations. For example, formation acidizing or "acidizing" is a method for, among other purposes, increasing the flow of desirable hydrocarbons from a subterranean formation. In a matrix acidizing procedure, an aqueous acidic treatment fluid is introduced into a subterranean formation via a well bore therein under pressure so that the acidic treatment fluid flows into the pore spaces of the formation and reacts with (e.g., dissolves) the acid-soluble materials therein. As a result, the pore spaces of that portion of the formation are enlarged, and the permeability of the formation may increase. The flow of hydrocarbons from the formation therefore may be increased because of the increase in formation conductivity caused, inter alia, by dissolution of the formation material. In fracture acidizing procedures, one or more fractures are produced in the formation(s) and an acidic treatment fluid is introduced into the fracture(s) to etch flow channels therein. Acidic treatment fluids also may be used to clean out well bores to facilitate the flow of desirable hydrocarbons. Other acidic treatment fluids may be used in diversion processes and well bore clean-out processes. A specific example is filter cake removal.

To increase the viscosity of an aqueous acidic treatment fluid, a suitable gelling agent may be included in the treatment fluid (often referred to as "gelling" the fluid). Gelling an aqueous acidic treatment fluid may be useful, among other purposes, to prevent the acid from becoming prematurely spent and inactive. Additionally, gelling an aqueous acidic treatment fluid may enable the development of wider fractures so that the gelled acidic treatment fluid may delay the interaction of the acid with an acid soluble component in the well bore or the formation. Moreover, gelling an aqueous acidic treatment fluid may permit better fluid loss control.

Acidic treatment fluids used in subterranean operations are predominantly water-based fluids that comprise gelling agents that may increase their viscosities. These gelling agents are usually biopolymers or synthetic polymers that, when hydrated and at a sufficient concentration, are capable of forming a more viscous fluid. Common gelling agents include polysaccharides (such as xanthan), synthetic polymers (such as polyacrylamide), and surfactant gel systems.

Acidic treatment fluids comprising xanthan generally have sufficient viscosity for lower temperature operations. At elevated temperatures (e.g., those above about 120° F. to about 150° F.), however, the viscosity of such xanthan treatment fluids sometimes is diminished. Consequently, xanthan may not be a suitable gelling agent for acidic treatment fluids when those fluids are used in subterranean formations that comprise elevated temperatures. Other gelling agents such as synthetic gelling agents (e.g., polyacrylamides) have been used in subterranean formations at these elevated temperatures, but often they are difficult to disperse and usually require considerable mixing or agitation to develop full viscosity. Additionally, most conventional gelling agents, including guar and some synthetic polymers, may form acid-insoluble residues. Surfactant gel systems also have been used in subterranean formations at these temperatures, but such systems can be expensive, can be sensitive to impurities, and may require hydrocarbon breakers.

SUMMARY OF THE INVENTION

The present invention relates to acidic treatment fluids used in industrial and/or subterranean operations, and more particularly, to acidic treatment fluids comprising clarified xanthan gelling agents, and methods of use in industrial and/or subterranean operations.

In one embodiment, the present invention provides methods comprising: providing an acidic treatment fluid that comprises an aqueous base fluid, an acid, and a gelling agent that comprises clarified xanthan; and introducing the acidic treatment fluid into a portion of a subterranean formation.

In another embodiment, the present invention provides methods of acidizing a portion of a subterranean formation comprising: providing an acidic treatment fluid that comprises an aqueous base fluid, an acid, and a gelling agent that comprises clarified xanthan; contacting a portion of the subterranean formation with the acidic treatment fluid; and allowing the acidic treatment fluid to interact with a component of the subterranean formation so that at least a portion of the component is dissolved.

In another embodiment, the present invention provides methods of diverting fluids in a subterranean formation comprising: providing an acidic treatment fluid comprising an aqueous base fluid, an acid, and a gelling agent that comprises clarified xanthan; introducing the acidic treatment fluid into a well bore that penetrates the subterranean formation; and allowing at least a first portion of the acidic treatment fluid to penetrate into a portion of the subterranean formation so as to substantially divert a second portion of the acidic treatment fluid or another treatment fluid to another portion of the subterranean formation.

The features and advantages of the present invention will be readily apparent to those skilled in the art upon a reading of the description of the preferred embodiments that follows.

BRIEF DESCRIPTION OF THE DRAWINGS

These drawings illustrate certain aspects of some of the embodiments of the present invention, and should not be used to limit or define the invention.

FIG. 2 also illustrates viscosity data from an experiment involving an embodiment of the present invention.

DESCRIPTION OF PREFERRED EMBODIMENTS

Figure 1:
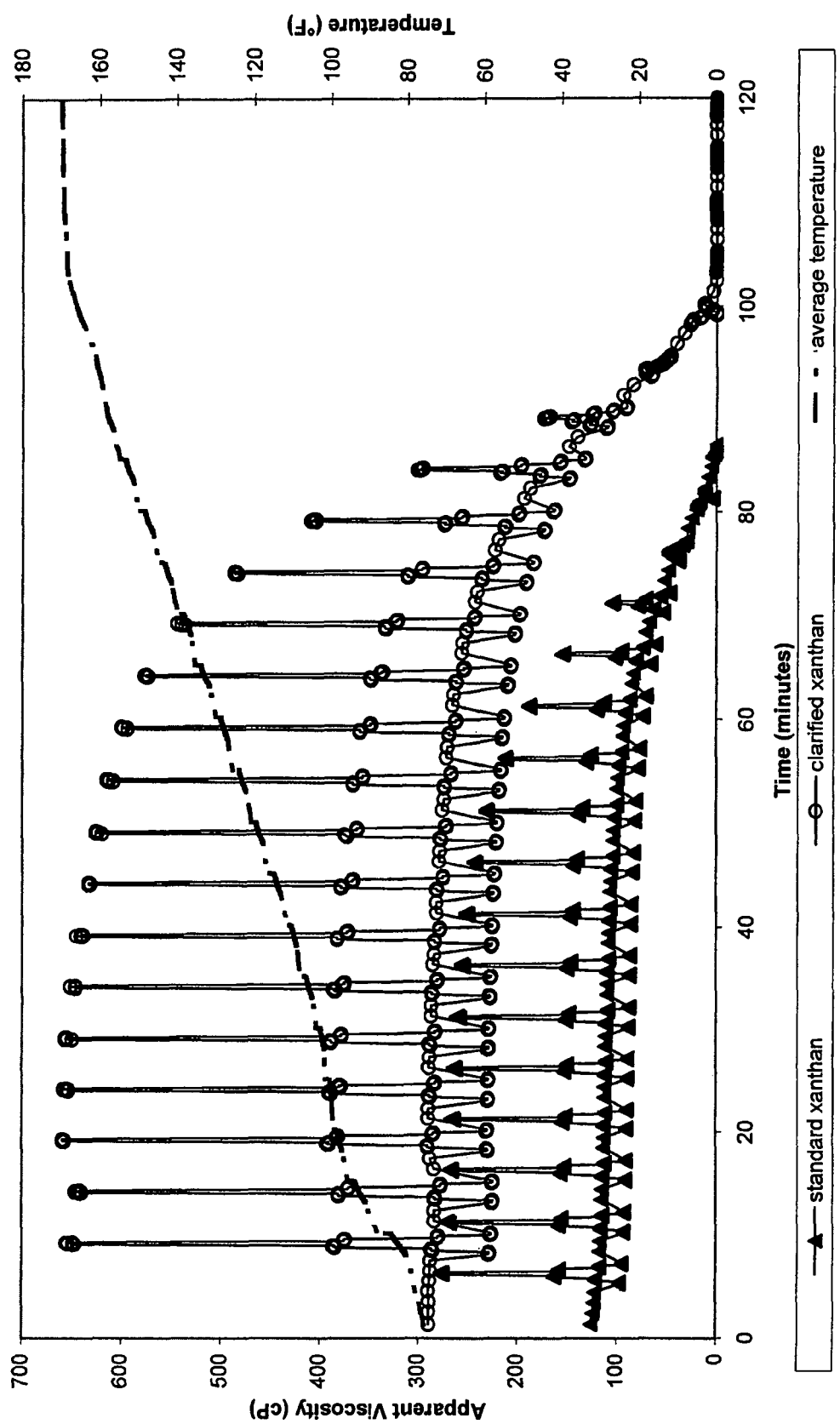
FIG. 1 illustrates viscosity data from an experiment involving an embodiment of the present invention.

The present invention relates to acidic treatment fluids used in industrial and/or subterranean operations, and more particularly, to acidic treatment fluids comprising clarified xanthan gelling agents, and methods of use in industrial and/or subterranean operations.

In certain embodiments, the acidic treatment fluids of the present invention generally comprise an aqueous base fluid, an acid, and a gelling agent of the present invention that comprises clarified xanthan. In certain embodiments, the term "clarified xanthan" refers to a xanthan that has not been treated, either chemically or otherwise, to affect its ability to disperse and hydrate in fresh water or salt solutions, or hydrate at a specific pH range. This definition controls the meaning of the term "clarified xanthan" in the claims of this application, particularly over any other definition found in any reference, patent, or patent application, whether or not it is referenced or incorporated by reference herein. In some embodiments, suitable clarified xanthans may have been treated with methods involving enzymes or any other suitable method, inter alia, to remove any debris from the xanthan polymer.

In some embodiments, the term "clarified xanthan" refers to a xanthan that has a flow rate of at least about 200 ml in 2 minutes at ambient temperature in a filtering laboratory test on a Baroid Filter Press using 40 psi of differential pressure and a 9 cm Whatman filter paper having a 2.7μ pore size. In some embodiments, suitable clarified xanthans are capable of hydrating in a brine to produce an increase in viscosity.

In some embodiments, suitable clarified xanthans may have been treated with enzymes or other suitable methods to remove residual cellular structures, such as cell walls, from a standard xanthan. In some embodiments, suitable clarified xanthans may be produced from genetically modified or bioengineered strains of bacteria or other strains of bacteria that allow the clarified xanthan to have improved functional properties such as filterability, turbidity, etc. In one embodiment, suitable clarified xanthans may be modified by genetic engineering or bacteria selection or the result of chemical treatment or derivatization of a xanthan. An example of such a modification would be where a portion of the xanthan is oxidized or hydrolyzed. In one embodiment, the clarified xanthan may be modified, such as nonacetylated and/or nonpyruvylated xanthan. As used herein, "nonacetylated" means having fewer acetyl groups than typical xanthan, whether the difference is the result of genetic engineering or bacteria selection or the result of chemical treatment of a typical xanthan. As used herein, "nonpyruvylated" means having fewer pyruvyl groups, whether the difference is the result of genetic engineering or bacteria selection or the result of chemical treatment of a xanthan. Furthermore, as used herein, nonpruvylated and nonacetylated are intended to encompass depruvylated and deacetylated, respectively. Another example of modified xanthan is partially oxidized xanthan. Suitable clarified xanthan may also be present in a form that will only partially hydrate or will not hydrate at ambient temperature. This form of clarified xanthan may be chemically modified, chemically coated, genetically modified, or produced from a new strain of bacteria.

In some embodiments, the present invention provides compositions and methods that may be especially suitable for use in well bores comprising a borehole temperature ("BHT") of up to about 300° F. In certain embodiments, the treating temperature may be below about 180° F. Typical xanthans show thermal degradation based on rheological measurements at about 140° F., and certain embodiments of the present invention show thermal degradation based on rheological measurements at about 170° F. One skilled in the art will recognize that there are a number of instances where fluid may be used successfully at temperatures above the BHT when cool-down is taken into account. The ability of the acidic treatment fluids of the present invention to maintain a degree of viscosity at such elevated temperatures may be affected by the time a particular fluid is exposed to such temperatures. For example, in some fracture acidizing applications, there may be a considerable fracture cool-down, which may enable utilization of an acidic treatment fluid of the present invention at BHT above the temperature limit at which the fluid exhibits significant viscosity.

Although some potential advantages of the present invention are discussed herein, this is in no way an exhaustive list of potential advantages and does not comprise the universe of objectives of the invention. One potential advantage of the many advantages of the fluids of the present invention is that they may be shear thinning fluids (e.g., the viscosity of the fluid decreases with rate of shear). Another potential advantage is that the gelling agents of the present invention comprising clarified xanthan may impart a higher regain of permeability to a fluid than conventional gelling agents. Another potential advantage is that the gelling agents of the present invention comprising clarified xanthan may result in fluids having a higher viscosity than conventional gelling agents at the same concentration. Another potential advantage is that the fluids may not leave undesirable residues in the formation once the fluid has been broken. Additionally, the gelling agents comprising clarified xanthan may present a cost savings over some conventional gelling agents (e.g., surfactant-based gelling agents) for acidic treatment fluid applications. Other potential advantages may include ease of mixing over other gelling agents (should not lump and therefore may not require adjusting the pH for polymer dispersion), potential capability of gelling any brine at a wider range of pH levels, potential relative ease of polymer hydration in the presence of certain common contaminants, potential capability of gelling formation brine (potentially saving time and cost), and potential ability to be directly added to an acid for gelation. Other potential advantages may be evident to one of ordinary skill in the art with the benefit of this disclosure.

The acidic treatment fluids of the present invention may be useful in a wide variety of subterranean treatment operations in which acidic treatment fluids may be suitable. For example, an acidic treatment fluid of the present invention having a sufficient viscosity may be used to divert the flow of fluids present within a subterranean formation (e.g., formation fluids, other treatment fluids) to other portions of the formation, for example, by invading the higher permeability portions of the formation with a fluid that has high viscosity at low shear rates. The methods and acidic treatment fluids of the present invention may be used during or in preparation for any subterranean operation wherein a fluid may be used. Suitable subterranean operations may include, but are not limited to, acidizing treatments (e.g., matrix acidizing or fracture acidizing), well bore clean-out treatments, and other suitable operations where a treatment fluid of the present invention may be useful.

In certain embodiments, the treatment fluids of the present invention may have a pH of about 4 or less. In certain embodiments (e.g., where the acid comprises hydrochloric acid), the treatment fluids may have a pH of about 1 or less. In certain embodiments (e.g., where the acid comprises an organic acid), the treatment fluids may have a pH of about 1 to about 4.

The acidic treatment fluids of the present invention may vary widely in density, depending on the chosen application. One of ordinary skill in the art with the benefit of this disclosure will recognize the particular density that is most appropriate for a particular application. In certain embodiments, the acidic treatment fluids of the present invention will have a density of about 8.3 pounds per gallon ("ppg") to about 19.2 ppg. The desired density for a particular acidic treatment fluid may depend on characteristics of the subterranean formation and/or fluids in the well bore. The density of a treatment fluid of the present invention may be adjusted, among other ways, by adding salts and/or brines. The types of salts or brines used to achieve the desired density of the acidic treatment fluid can be chosen based on factors such as compatibility with the formation, crystallization temperature, and compatibility with other treatment and/or formation fluids. Availability and environmental impact also may affect this choice.

The gelling agents used in the acidic treatment fluids of the present invention comprise a clarified xanthan. Suitable clarified xanthans should impart some degree of pseudoplastic rheology or shear thinning behavior to a fluid. Suitable clarified xanthans also may be soluble in hot or cold water, and may be stable over a range of pH levels and temperatures. Additionally, they may be compatible with and stable in systems containing salts, e.g., they may fully hydrate in systems comprising salts. Moreover, suitable clarified xanthans may provide good suspension for particulates often used in subterranean applications, such as proppant or gravel, and may have good filterability. An example of a suitable clarified xanthan for use in conjunction with the compositions and methods of the present invention is commercially available under the tradename "KELTROL® BT" from CP Kelco, in various locations including Chicago, Ill. "FLOCON 4800™" and "FLOCON 4800C™" are two other xanthans commercially available from SNF Floerger, Andrézieux—France, that may be suitable for use in conjunction with the present invention. The xanthan taught by Pace in U.S. Pat. No. 4,265,673 (the relevant disclosure of which is herein incorporated by reference) also may be suitable for use in conjunction with the present invention. The amount of gelling agent comprising clarified xanthan used in the acidic treatment fluids of the present invention may vary from about 1 lb/Mgal to about 200 lb/Mgal. In some embodiments, the amount of gelling agent comprising clarified xanthan included in the treatment fluids of the present invention may vary from about 20 lb/Mgal to about 100 lb/Mgal. In other embodiments, the amount of gelling agent comprising clarified xanthan included in the treatment fluids of the present invention may vary from about 30 lb/Mgal to about 80 lb/Mgal. In certain embodiments, about 60 lb/Mgal of a gelling agent comprising clarified xanthan is included in the treatment fluids of the present invention. In well bores comprising BHTs of 200° F. or more, 70 lbs/Mgal or more of the gelling agent comprising clarified xanthan may be used in a treatment fluid of the present invention. Clarified xanthans that may be suitable for use in the present invention also are disclosed in U.S. Patent Application Publication No. 2006/0014648 by Milson et al., the relevant disclosure of which is herein incorporated by reference.

Optionally, the gelling agents of the present invention may comprise an additional biopolymer if the use of the clarified xanthan and the biopolymer produces a desirable result, e.g., a synergistic effect. Suitable biopolymers may include polysaccharides and galactomannan gums. Depending on the application, one biopolymer may be more suitable than another. One of ordinary skill in the art with the benefit of this disclosure will be able to determine if a biopolymer should be included for a particular application based on, for example, the desired viscosity of the viscosified treatment fluid and the bottom hole temperature ("BHT") of the well bore.

The aqueous base fluids of the acidic treatment fluids of the present invention generally comprise fresh water, salt water, sea water, a brine (e.g., a saturated salt water or formation brine), or a combination thereof. Other water sources may be used, including those comprising monovalent, divalent, or trivalent cations (e.g., magnesium, calcium, zinc, or iron) and, where used, may be of any weight. If a water source is used that contains such divalent or trivalent cations in concentrations sufficiently high to be problematic, then such divalent or trivalent salts may be removed, either by a process such as reverse osmosis, or by raising the pH of the water in order to precipitate out such divalent salts to lower the concentration of such salts in the water before the water is used. Another method would be to include a chelating agent to chemically bind the problematic ions to prevent their undesirable interactions with the clarified xanthan. Suitable chelants include, but are not limited to, citric acid or sodium citrate, ethylene diamine tetra acetic acid ("EDTA"), hydroxyethyl ethylenediamine triacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenylacetic) acid ("EDDHA"), glucoheptonic acid, gluconic acid, and the like, and nitrilotriacetic acid ("NTA"). Other chelating agents also may be suitable. One skilled in the art will readily recognize that an aqueous base fluid containing a high level of multi-valent ions should be tested for compatibility prior to use.

In some embodiments, the base fluids suitable for use in the acidic treatment fluids of the present invention may be a foamed fluid (e.g., a liquid that comprises a gas such as nitrogen, carbon dioxide, air or methane). As used herein, the term "foamed" also refers to fluids such as co-mingled fluids. In certain embodiments, it may be desirable that the base fluid is foamed to, inter alia, reduce the amount of base fluid that is required, e.g. in water sensitive subterranean formations, to reduce fluid loss to the subterranean formation, and/or to provide enhanced proppant suspension. In addition, in certain embodiments where the acidic treatment fluids of the present invention are used for fluid diversion, it may be desirable that the acidic treatment fluid be foamed. While various gases can be utilized for foaming the acidic treatment fluids of this invention, nitrogen, carbon dioxide, and mixtures thereof are preferred. In examples of such embodiments, the gas may be present in a acidic treatment fluid of the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application. One example of a foamed fluid suitable for use with the present invention are those disclosed in U.S. patent application Ser. No. 11/506,703, the relevant disclosure of which is herein incorporated by reference.

If desired, the acidic treatment fluids of the present invention may also be used in the form of an emulsion. An example of a suitable emulsion may comprise an aqueous base fluid comprising a clarified xanthan gelling agent and a suitable hydrocarbon. In some embodiments, the emulsion may comprise approximately 30% of an aqueous base fluid and 70% of a suitable hydrocarbon. In some embodiments, the external phase of the emulsion may be aqueous. In certain embodiments, it may be desirable to use an emulsion to, inter alia, reduce fluid loss to the subterranean formation, and/or to provide enhanced proppant suspension. Other benefits and advantages to using emulsions in the methods of the present invention will be evident to one of ordinary skill in the art.

The acidic treatment fluids of the present invention may vary widely in density. One of ordinary skill in the art with the benefit of this disclosure will recognize the particular density that is most appropriate for a particular application. In some embodiments, the density of the non-foamed acidic treatment fluids of the present invention generally may approximate the density of water. In other embodiments, the density of the non-foamed acidic treatment fluids of the present invention generally may range from about 8.3 pounds per gallon ("ppg") to about 30 ppg. One of ordinary skill in the art with the benefit of this disclosure will recognize that the density of any particular acidic treatment fluid of the present invention may also vary depending on the addition of certain additives, including, but not limited to, inorganic salts, proppant, gas, fluid loss control additives, alcohols, glycols, and/or hydrocarbons. Furthermore, the desired density for a particular acidic treatment fluid may depend on characteristics of the subterranean formation, including, inter alia, the hydrostatic pressure required to control the fluids of the subterranean formation during placement of the acidic treatment fluids, and the hydrostatic pressure which may damage the subterranean formation. For example, if the acidic treatment fluid remains in the well bore, the density of the acidic treatment fluid may be adjusted to, inter alia, prevent the changing of position of a fluid relative to another fluid with a different density, thereby leaving the acidic treatment fluid at the correct placement within the well bore.

In some embodiments, the acidic treatment fluid may comprise a brine. Brines suitable for use in some embodiments of the present invention may include those that comprise monovalent, divalent, or trivalent cations. Some divalent or trivalent cations, such as magnesium, calcium, iron, and zinc, may, in some concentrations and at some pH levels, cause undesirable crosslinking of a xanthan polymer. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the xanthan. As used herein, the term "chelating agent" or "chelant" also refers to sequestering agents and the like. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, mixtures thereof, and the like. The brine chosen should be compatible with the formation and should have a sufficient density to provide the appropriate degree of well control. Additional salts may be added to a water source, e.g., to provide a brine, and a resulting acidic treatment fluid, having a desired density. The amount of salt that should be added should be the amount necessary for formation compatibility, such as the amount necessary for the stability of clay minerals, taking into consideration the crystallization temperature of the brine, e.g., the temperature at which the salt precipitates from the brine as the temperature drops. Preferred suitable brines may include seawater and/or formation brines.

Suitable acids for inclusion in the acidic treatment fluids of the present invention include any acid suitable for use in a subterranean application. Examples include hydrochloric acid, hydrofluoric acid, acetic acid, formic acid, citric acid, lactic acid, glycolic acid, sulfamic acid, and derivatives and combinations thereof. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The choice of aqueous base fluid and acid may be chosen vis-à-vis the other, among other reasons, so that the proper synergistic effect is achieved. The concentration and type of acid selected may be based upon the function of the acid (e.g., scale removal, fracture acidizing, matrix acidizing, removal of fluid loss filter cakes and pills, and the like), compatibility with crude oil, and the mineralogy and temperature of the formation. One should be mindful that certain concentrations of acids may have a tendency to form precipitates upon spending, such as formic acid.

Optionally, the gelling agents comprising clarified xanthan and acidic treatment fluids of the present invention may comprise an additional biopolymer. In certain embodiments, the use of the clarified xanthan and the biopolymer may produce a synergistic effect. Suitable biopolymers may include, but are not limited to, polysaccharides, galactomannan gums, scleroglucan, diutan, clarified versions thereof, combinations thereof, and derivatives thereof. Derivatization of these biopolymers may involve, among other things, chemical treatment/modification, differences resulting from the result of genetic engineering, from the result of strain selection, and the like. Moreover, "clarified versions" of these biopolymers refers to a biopolymer that has not been treated, either chemically or otherwise, to affect its ability to disperse and hydrate in fresh water or salt solutions, or hydrate at a specific pH range. In some embodiments, suitable clarified biopolymers may have been treated with methods involving enzymes or any other suitable method, inter alia, to remove any debris from the biopolymer. A suitable source of diutan is "GEO-VIS® XT," which is commercially available from Kelco Oil Field Group, Houston, Tex. Other suitable sources of diutan are "FDP-S848-07" and "FDP-S849-07" which are commercially available from Halliburton Energy Services, Duncan, Okla. Depending on the application, one biopolymer may be more suitable than another. For example, an acidic treatment fluid containing an organic acid may require less of an additional biopolymer comprising scleroglucan and/or diutan than an acidic treatment fluid containing hydrochloric acid. One of ordinary skill in the art with the benefit of this disclosure will be able to determine if a biopolymer should be included for a particular application based on, for example, the desired viscosity of the acidic treatment fluid and the bottom hole static temperature of the formation where the fluid is to be used. Another reason for using a mixture of clarified xanthan with scleroglucan is that, under some conditions, scleroglucan may exhibit reduced regain permeability. By mixing scleroglucan with clarified xanthan, one still may be able to obtain the superior temperature performance of scleroglucan while also having the better regain permeability characteristics of the clarified xanthans.

The gelling agents comprising clarified xanthan may be present in an acidic treatment fluid of the present invention in an amount of from about 1 lb/Mgal to about 200 lb/Mgal. In embodiments wherein the gelling agents comprising clarified xanthan further comprise scleroglucan, one may include about 1 lb/Mgal to about 200 lb/Mgal of scleroglucan. In an acidic treatment fluid that comprises hydrochloric acid, one may include about 1 to about 200 lb/Mgal of scleroglucan. In embodiments wherein the gelling agents comprising clarified xanthan further comprise diutan, one may include about 1 to about 200 lb/Mgal of diutan. In an acidic treatment fluid that comprises about 15% hydrochloric acid, one may include about 1 to about 200 lb/Mgal of diutan. In some embodiments, one may include about 10 to about 150 lb/Mgal of clarified xanthan, scleroglucan, and/or diutan. A person of skill in the art with the benefit of this disclosure will recognize that any specific concentration or narrower range of concentrations of the gelling agents of the present invention encompassed by the broader concentration ranges specifically articulated above may be used and/or may be particularly advantageous for a particular embodiment of the present invention.

In certain embodiments, the acidic treatment fluids of the present invention also may comprise any additional additive that may be suitable in a particular application of the present invention, including, but not limited to, any of the following: hydrate inhibitors, clay stabilizers, bactericides, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), corrosion inhibitors, corrosion inhibitor intensifiers, pH control additives, surfactants, breakers, fluid loss control additives, scale inhibitors, asphaltene inhibitors, paraffin inhibitors, salts, bactericides, crosslinkers, stabilizers, chelants, foamers, defoamers, emulsifiers, demulsifiers, iron control agents, solvents, mutual solvents, particulate diverters, gas phase, carbon dioxide, nitrogen, other biopolymers, synthetic polymers, friction reducers, combinations thereof, or the like. The acidic treatment fluids of the present invention also may include other additives that may be suitable for a given application, as will be recognized by a person of ordinary skill in the art, with the benefit of this disclosure.

Examples of hydrate inhibitors that may be suitable for use include thermodynamic inhibitors, methanol, mutual solvents, monoethylene glycol (MEG), di-ethylene glycol (DEG), glycols, kinetic inhibitors, and anti-agglomerants. Others known in the art may be suitable as well.

In some embodiments, the acidic treatment fluids of the present invention may contain bactericides, inter alia, to protect both the subterranean formation as well as the viscosified treatment fluid from attack by bacteria. Such attacks may be problematic because they may lower the viscosity of the acidic treatment fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Examples of suitable bactericides include, but are not limited to, a 2,2-dibromo-3-nitrilopropionamide, commercially available under the tradename BE-3S™ biocide from Halliburton Energy Services, Inc., of Duncan, Okla., and a 2-bromo-2-nitro-1,3-propanediol commercially available under the tradename BE-6™ biocide from Halliburton Energy Services, Inc., of Duncan, Okla. In one embodiment, the bactericides are present in the acidic treatment fluid in an amount in the range of from about 0.001% to about 1.0% by weight of the acidic treatment fluid. In certain embodiments, when bactericides are used in the viscosified acidic fluids of the present invention, they may be added to the acidic treatment fluid before the gelling agent is added.

Examples of corrosion inhibitors that may be suitable for use include acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, formamides, combinations of such compounds used in conjunction with iodine, quaternary ammonium compounds, and combinations thereof. Corrosion inhibitors that may be suitable are available from Halliburton Energy Services and include: "MSA II™" corrosion inhibitor, "MSA III™" corrosion inhibitor, "HAI-404M™" acid corrosion inhibitor, "HAI-81M™" Acid corrosion inhibitor, "HAI-85M™" Acid corrosion inhibitor, "HAI-202 Environmental Corrosion Inhibitor," "HAI-OS" Corrosion Inhibitor, "HAI-GE" Corrosion Inhibitor, and "FDP-S692-03" Corrosion inhibitor for organic acids. In certain embodiments, a corrosion inhibitor activator may be included. Examples of corrosion inhibitor activators that may be used include, but are not limited to, cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. Corrosion inhibitors intensifiers that may be suitable are available from Halliburton Energy Services and include: "HII-500™" Corrosion inhibitor intensifier, "HII-500M™" Corrosion inhibitor intensifier, "HII-124B" Acid inhibitor intensifier, "HII-124C™" Inhibitor intensifier, and "HII-124F™" corrosion inhibitor intensifier. The amount of a corrosion inhibitor to include in an acidic treatment fluid of the present invention will depend on many factors, including but not limited to, the metallurgy the acid will contact, contact time, temperature, other acid blend additives, etc. Where included, the amount of a corrosion inhibitor to include may range from about 0.1% to about 3% by volume where liquid products are used and from about 0.5% to about 200% by weight where solid products are used. Suitable iron control agents are available from Halliburton Energy Services and include: "FE-2™" Iron sequestering agent, "FE-2A™" Buffering agent, "FE-3™" Iron control agent, "FE-3A™" Iron control agent, "FE-5A™" Iron control agent, "FERCHEK®" Ferric iron inhibitor, "FERCHEK® A" Reducing agent, and "FERCHEK® SC" Iron control system. Other suitable iron control agents include those described in U.S. Pat. Nos. 6,315,045, 6,525, 011, 6,534,448, and 6,706,668, the relevant disclosures of which are hereby incorporated by reference.

In some embodiments, a pH control additive may be included, which may comprise a chelating agent. When added to the treatment fluids of the present invention, such a chelating agent, among other functions, may chelate any dissolved iron (or other divalent or trivalent cation) that may be present in the water. Such chelating may prevent such ions from crosslinking the gelling agent molecules. Such crosslinking may be problematic, inter alia, because it may cause severe filtration problems, prevent injection in to the formation to optimize iron control, and/or cause polymer break or the formation of residue in the formation. Any suitable chelating agent may be used with the present invention. Examples of chelating agents that may be suitable include, but are not limited to, an anhydrous form of citric acid, commercially available under the tradename "FE-2™" Iron Sequestering Agent from Halliburton Energy Services, Inc., of Duncan, Okla. Another example of a suitable chelating agent is a solution of citric acid dissolved in water, commercially available under the tradename "FE-2A™" buffering agent from Halliburton Energy Services, Inc., of Duncan, Okla. Another example of a suitable chelating agent is sodium citrate from Halliburton Energy Services, Inc. of Duncan, Okla. Other chelating agents that may be suitable for use with the present invention include, inter alia, nitrilotriacetic acid and any form of ethylene diamine tetracetic acid ("EDTA") or its salts, hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenylacetic) acid ("EDDHA"), glucoheptonic acid, gluconic acid, sodium citrate, phosphonic acid, salts thereof, and the like. In some embodiments, the chelating agent may be a sodium or potassium salt. Generally, the chelating agent may be present in an amount sufficient to prevent crosslinking of the gelling agent molecules by any free iron (or any other divalent or trivalent cation) that may be present. In one embodiment, the chelating agent may be present in an amount of from about 0.02% to about 2.0% by weight of the treatment fluid. In another embodiment, the chelating agent is present in an amount in the range of from about 0.02% to about 0.5% by weight of the treatment fluid. One of ordinary skill in the art with the benefit of this disclosure will be able to determine the proper concentration of optional chelating agents for a particular application.

In another embodiment, the optional pH control additive may be an acid, which may comprise any known acid, including but not limited to the acid already included in the acidic treatment fluids of the present invention. Examples of acids that may be suitable include, inter alia, hydrochloric acid, hydrofluoric acid, phosphonic acid, p-toluenesulfonic acid, acetic acid, formic acid, citric acid, derivatives thereof, and combinations thereof.

In some embodiments, the pH control additive may be an acid composition. Examples of suitable acid compositions may comprise an acid, an acid generating compound, and combinations thereof. Any known acid may be suitable for use with the treatment fluids of the present invention. Examples of acids that may be suitable for use in the present invention include, but are not limited to organic acids (e.g., formic acids, acetic acids, carbonic acids, citric acids, glycolic acids, lactic acids, ethylenediaminetetraacetic acid ("EDTA"), hydroxyethyl ethylenediamine triacetic acid ("HEDTA"), and the like), inorganic acids (e.g., hydrochloric acid, hydrofluoric acid, phosphonic acid, p-toluenesulfonic acid, and the like), and combinations thereof.

Examples of acid generating compounds that may be suitable for use in the present invention include, but are not limited to, esters, aliphatic polyesters, ortho esters, which may also be known as ortho ethers, poly (ortho esters), which may also be known as poly(ortho ethers), poly(lactides), poly (glycolides), poly($\epsilon$-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers and the like. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. An example of a suitable acid generating compound is a citrate ester commercially available from Halliburton Energy Services, Inc., of Duncan, Okla., under the tradename MATRIXFLO™ II Breaker. Other suitable materials may be disclosed in U.S. Pat. Nos. 6,877,563 and 7,021,383, the disclosures of which are incorporated by reference.

The optional pH control additive also may comprise a base to elevate the pH of the treatment fluid, for example, when this fluid is used as a diverting fluid. Any known base that is compatible with the gelling agents comprising clarified xanthan can be used in the viscosified treatment fluids of the present invention. Examples of bases that may be suitable include, but are not limited to, sodium hydroxide, potassium carbonate, potassium hydroxide, sodium bicarbonate, sodium carbonate, derivatives thereof, and combinations thereof. An example of a base that may be suitable is a solution of 25% sodium hydroxide commercially available from Halliburton Energy Services, Inc., of Duncan, Okla., under the tradename "MO-67™" pH control agent. An example of a base solution that may be suitable is a solution of potassium carbonate commercially available from Halliburton Energy Services, Inc., of Duncan, Okla., under the tradename "BA-40L™" buffering agent. One of ordinary skill in the art with the benefit of this disclosure will recognize the suitable bases that may be used to achieve a desired pH elevation in a particular application of the present invention.

In still another embodiment, the optional pH control additive may comprise a combination of an acid and a chelating agent or a base and a chelating agent. Such combinations may be suitable, inter alia, when the addition of a chelating agent (e.g., in an amount sufficient to chelate the iron present) is insufficient by itself to achieve the desired pH level.

In some embodiments, the acidic treatment fluids of the present invention may include surfactants, e.g., to improve the compatibility of the acidic treatment fluids with other fluids (like any formation fluids) that may be present in the subterranean formation. A person of ordinary skill, with the benefit of this disclosure, will be able to identify the type of surfactant as well as the appropriate concentration of surfactant to be used. Examples of surfactants that may be suitable include, but are not limited to, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and mixtures thereof. Suitable surfactants may be used in a liquid or powder form. Where used, the surfactants are present in the acidic treatment fluid in an amount sufficient to prevent incompatibility with formation fluids or well bore fluids. In an embodiment where liquid surfactants are used, the surfactants may be present in an amount in the range of from about 0.01% to about 5.0% by volume of the acidic treatment fluid. In one embodiment, the liquid surfactants are present in an amount in the range of from about 0.01% to about 2.0% by volume of the acidic treatment fluid. In embodiments where powdered surfactants are used, the surfactants may be present in an amount in the range of from about 0.001% to about 0.5% by weight of the acidic treatment fluid. Examples of surfactants that may be suitable include non-emulsifiers commercially available from Halliburton Energy Services, Inc., of Duncan, Okla., under the tradenames "LOSURF-300M™" nonionic surfactant, "LOSURF-357™" nonionic surfactant, "LOSURF-400™" surfactant, "LOSURF-2000S™" solid surfactant, "LOSURF-2000M™" solid surfactant, and "LOSURF-259™" nonionic non-emulsifier. Another example of a surfactant that may be suitable is a non-emulsifier commercially available from Halliburton Energy Services, Inc., of Duncan, Okla., under the tradename "NEA-96M™" Surfactant. Other examples of surfactants that may be suitable that are commercially available from Halliburton Energy Services in Duncan, Okla. are products "SGA-1," "EFS-1," "EFS-2," "EFS-3," and "EFS-4." Other surfactants that may be suitable may include betaines and quaternary ammonium compounds. Examples of betaines that are commercially available include MIRATAINE® and MIRATAINE® BET 0-30 both available for Rhodia and REWOTERIC® AM TEG available for Degussa. Examples of commercially available quaternary ammonium compounds include ARQUAD® 22-80 and ETHOQUAD® O/12 PG both available from Akzo Nobel and GENAMIN KDMP available from Clariant. It may be beneficial to add a surfactant to an acidic treatment fluid of the present invention as that fluid is being pumped downhole, among other things, to help reduce the possibility of forming emulsions with the formation crude oil. Furthermore, in some embodiments, microemulsion additives optionally may be included in the treatment fluids of the present invention. Examples of microemulsion additives that may be suitable include, but are not limited to, "PEN-88M™" surfactant, "PEN-88HT™" surfactant, "SSO-21E" surfactant, "SSO-21MW™" surfactant, GASPERM 1000™ Microemulsion Surfactant/Solvent Additive, which are all commercially available from Halliburton Energy Services, Inc., of Duncan, Okla. Other microemulsion additives that may be suitable are MA-845 additive and MA-844 additive, commercially available from CESI Chemical of Duncan, Okla.; SHALESURF 1000 additive, commercially available from Frac Tech Services of Aledo, Tex.; and those disclosed in U.S. Patent App. No. 2003/0166472, the relevant disclosure of which is incorporated by reference.

It should be noted that, in some embodiments, it may be beneficial to add a surfactant to a treatment fluid of the present invention as that fluid is being pumped downhole to help eliminate the possibility of foaming. However, in those embodiments where it is desirable to foam the treatment fluids of the present invention, surfactants such as HY-CLEAN(HC-2)™ surface-active suspending agent or AQF-2™ additive, both commercially available from Halliburton Energy Services, Inc., of Duncan, Okla., may be used. Additional examples of foaming agents that may be utilized to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable surfactants that may or may not be foamers in a particular application that are available from Halliburton Energy Services include: 19N, G-SPERSE dispersant, HOWCO-SUDS™ foaming agent, and A-SPERSE™ dispersing aid for acid additives. Other suitable foaming agents and foam stabilizing agents may be included as well, which will be known to those skilled in the art with the benefit of this disclosure.

While typically not required, the acidic treatment fluids of the present invention also may comprise breakers capable of reducing the viscosity of the acidic treatment fluid at a desired time. Examples of such breakers that may be suitable for the acidic treatment fluids of the present invention include, but are not limited to, sodium chlorite, hypochlorites, perborates, persulfates, peroxides (including organic peroxides), enzymes, derivatives thereof, and combinations thereof. Other suitable breakers may include suitable acids. Examples of peroxides that may be suitable include tert-butyl hydroperoxide and tert-amyl hydroperoxide. A breaker may be included in an acidic treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the breaker(s) with a material that will degrade when placed downhole so as to release the breaker at the appropriate time. Coating materials that may be suitable include, but are not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples of materials that can undergo such degradation include polysaccharides such as dextran or cellulose; chitins; chitosans; proteins; aliphatic polyesters; poly (lactides); poly(glycolides); poly(ε-caprolactones); poly(hydroxybutyrates); poly(anhydrides); aliphatic polycarbonates; orthoesters, poly(orthoesters); poly(amino acids); poly(ethylene oxides); polyphosphazenes; derivatives thereof; and combinations thereof. If used, a breaker should be included in a composition of the present invention in an amount sufficient to facilitate the desired reduction in viscosity in a viscosified treatment fluid. For instance, peroxide concentrations that may be used vary from about 0.1 to about 10 gallons of peroxide per 1000 gallons of the acidic treatment fluid.

Optionally, an acidic treatment fluid of the present invention may contain an activator or a retarder, inter alia, to optimize the rate at which the fluid is "broken" (i.e., the viscosity of the fluid is reduced). Any known activator or retarder that is compatible with the fluid and the components thereof is suitable for use in the present invention. Examples of such activators that may be suitable include, but are not limited to, acid generating materials, chelated iron, copper, cobalt, reducing sugars, derivatives thereof, and combinations thereof. Examples of retarders that may be suitable include sodium thiosulfate and diethylene triamine. In some embodiments, the sodium thiosulfate may be used in a range of from about 1 to about 100 lbs per 1000 gallons of acidic treatment fluid. A preferred concentration range may be from about 5 to about 20 lbs per 1000 gallons. A person of ordinary skill with the benefit of this disclosure will be able to identify a suitable activator or retarder and the proper concentration of such activator or retarder for a given application.

The acidic treatment fluids of the present invention also may comprise suitable fluid loss control agents. Such fluid loss control agents may be useful, among other instances, when an acidic treatment fluid of the present invention is being used in a fracturing application. This may be due, in part, to the clarified xanthan's potential to leak off into formation. Any fluid loss agent that is compatible with the treatment fluid may be suitable for use in the present invention. Examples include, but are not limited to, starches, silica flour, and diesel dispersed in a fluid. Other examples of fluid loss control additives that may be suitable are those that comprise a degradable material. Suitable degradable materials include degradable polymers. Specific examples of suitable polymers include polysaccharides such as dextran or cellulose; chitins; chitosans; proteins; aliphatic polyesters; poly(lactides); poly(glycolides); poly(glycolide-co-lactides); poly($\epsilon$-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; or combinations thereof. If included, a fluid loss additive should be added to an acidic treatment fluid of the present invention in an amount of about 5 to about 2000 pounds per 1000 gallons of the acidic treatment fluid. In certain embodiments, the fluid loss additive may be included in an amount from about 10 to about 50 pounds per 1000 gallons of the acidic treatment fluid. For some liquid additives like diesel, these may be included in an amount from about 0.01% to about 20% by volume; in some embodiments, these may be included in an amount from about 1% to about 10% by volume.

Scale inhibitors optionally may be added to the acidic treatment fluids of the present invention, for example, when an acidic treatment fluid of the present invention is not particularly compatible with the formation waters in the formation in which it is being used. Any scale inhibitor that is compatible with the acidic treatment fluid in which it will be used may be suitable for use in the present invention. This may include water soluble organic molecules with carboxylic acid, aspartic acid, maleic acids, sulphonic acids, phosphonic acid and phosphate esters groups including copolymers, terpolymers, grafted copolymers, derivatives thereof, and combinations thereof. Examples of such compounds include aliphatic phosphonic acids such as diethylene triamine penta (methylene phosphonate) and polymeric species such as polyvinylsulphonate. The scale inhibitor may be in the form of the free acid, or may be in the form of mono- and polyvalent cation salts such as those comprising $Na^+$, $K^+$, $Al^+$, $Fe^+$, $Ca^+$, $Mg^+$, $NH_4^+$ cations. An example of a preferred scale inhibitor is "SCALECHECK® LP-55 Scale Inhibitor" from Halliburton Energy Services in Duncan, Okla. Another example of a preferred scale inhibitor is "LP-65™ Scale Inhibitor" available from Halliburton Energy Services in Duncan, Okla. If used, a scale inhibitor should be included in an amount effective to inhibit scale formation. For some applications, suitable amounts of scale inhibitors that may be included in the treatment fluids of the present invention may range from about 0.05 to 100 gallons per about 1000 gallons of the treatment fluid.

Salts optionally may be included in the acidic treatment fluids of the present invention for many purposes, including adjusting the density of the fluid. One of ordinary skill in the art with the benefit of this disclosure will recognize the particular type of salt appropriate for particular application, given considerations such as protection of the formation, the presence or absence of reactive clays in the formation adjacent to the well bore, compatibility with the other acidic treatment fluid additives, and the factors affecting wellhead control. To determine whether a salt may be used, a compatibility test may be performed to identify potential compatibility problems. From such tests, one of ordinary skill in the art with the benefit of this disclosure will be able to determine whether a salt should be included in an acidic treatment fluid of the present invention, as well as the appropriate selection of salts. Suitable salts may include, but are not limited to, calcium bromide, zinc bromide, calcium chloride, sodium chloride, sodium bromide, potassium bromide, potassium chloride, sodium nitrate, sodium formate, potassium formate, cesium formate, magnesium chloride, ammonium chloride, derivatives thereof, mixtures thereof, and the like.

The treatment fluids of the present invention optionally may comprise a suitable crosslinker, inter alia, to crosslink the clarified xanthan. Crosslinking may be desirable at higher temperatures and/or when the sand suspension properties of a particular fluid of the present invention may need to be altered for a particular purpose. Suitable crosslinkers include, but are not limited to, boron derivatives; potassium derivatives, including but not limited to, potassium periodate or potassium iodate; ferric iron derivatives; magnesium derivatives; and the like. Any crosslinker that is compatible with the clarified xanthan in the gelling agent may be suitable for use in the present invention. One of ordinary skill in the art, with the benefit of this disclosure, will recognize when such crosslinkers are appropriate and what particular crosslinker will be most suitable. Typically, a crosslinking agent may be included in an amount of from about 0.01 lb/Mgal to about 15 lb/Mgal.

The treatment fluids of the present invention optionally may comprise a stabilizer, for example, if a chosen acidic treatment fluid of the present invention is experiencing a viscosity degradation. One example of a situation where a stabilizer might be beneficial is where the borehole temperature of the well bore is sufficient by itself to break the acidic treatment fluid. Suitable stabilizers may include, but are not limited to, sodium thiosulfate. Such stabilizers may be useful, for example, when the acidic treatment fluids of the present invention are utilized in a subterranean formation having a temperature above about 150° F. If included, a stabilizer may be added in an amount from about 1 lb to about 50 lb per 1000 gal of acidic treatment fluid. In other embodiments, a stabilizer may be included in an amount of from about 5 to about 20 lb per 1000 gal of acidic treatment fluid.

In certain embodiments, an acidic treatment fluid of the present invention may be prepared according to a process comprising: providing an aqueous base fluid having a suitable density; adding optional additives such as biocides, chelating agents, pH control agents, and the like; filtering the aqueous base fluid through a 2-µm (or finer) filter; dispersing the gelling agent comprising a clarified xanthan into the aqueous base fluid with adequate shear to fully disperse polymer therein; and mixing the treatment fluid until the clarified xanthan is fully hydrated. However, these methods may be varied in any manner appropriate for a particular application of the present invention, as will be recognized by a person of skill in the art, with the benefit of this disclosure.

An embodiment of the present invention provides a method comprising: providing an acidic treatment fluid that comprises an aqueous base fluid, an acid, and a gelling agent that comprises clarified xanthan; and introducing the acidic treatment fluid into a portion of a subterranean formation.

An embodiment of the present invention provides a method of acidizing a portion of a subterranean formation comprising: providing an acidic treatment fluid that comprises an aqueous base fluid, an acid, and a gelling agent that comprises clarified xanthan; contacting a portion of the subterranean formation with the acidic treatment fluid; and allowing the acidic treatment fluid to interact with a component of the subterranean formation so that at least a portion of the component is dissolved.

An embodiment of the present invention provides a method of diverting fluids in a subterranean formation. In an example of such a method, the method may comprise: providing an acidic treatment fluid comprising an aqueous base fluid, an acid, and a gelling agent that comprises clarified xanthan; introducing the acidic treatment fluid into a well bore that penetrates the subterranean formation; and allowing at least a first portion of the acidic treatment fluid to penetrate into a portion of the subterranean formation so as to substantially divert a second portion of the acidic treatment fluid or another treatment fluid to another portion of the subterranean formation. In certain embodiments, the first portion of the acidic may divert the second portion of the acidic treatment fluid or another treatment fluid to another portion of the subterranean formation by becoming a sufficiently rigid gel to do so. These steps may be repeated as desired.

Furthermore, the acidic treatment fluids used in the methods of the present invention (or any component thereof) may be provided "on-the-fly" (i.e., at a jobsite just prior to use, with or without a hydration tank) or by batch process (pre-mixing). Additionally, the polymers of the present invention may be used as a dry powder, an liquid gel concentrate (LGC), a paste, or as a slurry.

To facilitate a better understanding of the present invention, the following examples of some embodiments are given. In no way should such examples be read to limit, or define, the scope of the invention.

EXAMPLES

Example 1

Fluid preparation: Acidic treatment fluids comprising xanthan were prepared by making a 15% HCl solution containing 83.47 lb/Mgal of standard xanthan commercially available from Halliburton Energy Services, Duncan Okla. under the tradename "WG-24," in a Waring blender. The fluid was mixed (hydrated) for 30 minutes. Acidic treatment fluids comprising a clarified xanthan gelling agent were prepared in a similar manner using 83.47 lb/Mgal of a clarified xanthan instead of the standard xanthan.

Fluid evaluation: The fluids were then evaluated on a Nordman Model 50 viscometer using a modified API2 program that consisted of 118/29/88 rpm ramping scan with 88 rpm as the base. When the sample reached the target temperature, it performed its first ramping scan. Thereafter, ramping scans occurred every 10 to 15 minutes. Each ramping scan provided shears at 118 rpm ($100^{s-1}$), 88 rpm ($75^{s-1}$), 59 rpm ($50^{s-1}$), and 29 rpm ($25^{s-1}$), then back to 59, 88, and 118 rpm before settling to 88 rpm. At the end of the test, the data was collected and the time averaged. The results are shown in FIG. 1. In FIG. 1, the apparent viscosity is given on the major Y-axis and the sample temperature is given on the minor Y-axis. These data demonstrate the certain treatment fluids of the present invention comprising a gelling agent that comprises clarified xanthan can maintain higher viscosities at higher temperatures than certain similar fluids comprising a standard xanthan gelling agent.

Example 2

Fluid preparation: Five acidic treatment fluids were prepared by mixing a 15% HCl fluid containing varying ratios of clarified xanthan and/or scleroglucan at 83.47 lb/Mgal in a Waring blender. The fluid was mixed (hydrated) for 30 minutes. Acidic treatment fluids comprising a scleroglucan gelling agent and various compositions of a clarified xanthan and scleroglucan gelling agent were prepared in a similar manner using 83.47 lb/Mgal. Table 1 shows the ratio of clarified xanthan and scleroglucan of each sample fluid tested.

TABLE 1

Sample Fluids Tested.

| Sample Composition No. | Clarified Xanthan (%) | Scleroglucan (%) |
|---|---|---|
| 1 | 100 | 0 |
| 2 | 0 | 100 |
| 3 | 75 | 25 |
| 4 | 50 | 50 |
| 5 | 25 | 75 |

Fluid evaluation: The fluids were evaluated on a Nordman Model 50 viscometer using a standard bob spring and the BI bob. Testing protocol was a modified API2 test with 1° F./min temperature ramp. The results are shown in FIG. 2. In FIG. 2, the apparent viscosity is given on the major Y-axis and the sample temperature is given on the minor Y-axis. FIG. 2 demonstrates that certain treatment fluids of the present invention comprising a gelling agent that comprises clarified xanthan and scleroglucan may exhibit improved rheological performance as compared to a treatment fluid of the present invention wherein the gelling agent comprises clarified xanthan alone.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" and "an", as used in the claims, is defined herein to mean one or more than one of the element that it introduces. Also, the terms in the claims have their plain, ordinary meaning unless otherwise explicitly and clearly defined by the patentee.

What is claimed is:

1. An acidic treatment fluid that comprises an aqueous base fluid, an acid, and a gelling agent comprising clarified xanthan.

2. The acidic treatment fluid of claim 1 wherein the pH of the acidic treatment fluid is about 4 or less.

3. The acidic treatment fluid of claim 1 wherein the acid comprises at least one acid selected from the group consisting of: hydrochloric acid; hydrofluoric acid; acetic acid; formic acid; citric acid; lactic acid; glycolic acid; sulfamic acid; any derivative thereof; and any combination thereof.

4. The acidic treatment fluid of claim 1 wherein the gelling agent is present in the acidic treatment fluid in an amount of about 1 lb/Mgal to about 200 lb/Mgal.

5. The acidic treatment fluid of claim 1 wherein the gelling agent is at least partially crosslinked through a crosslinking reaction that comprises a crosslinking agent.

6. The acidic treatment fluid of claim 1 further comprising at least one additive selected from the group consisting of: a hydrate inhibitor; a corrosion inhibitor; a pH control additive; a surfactant; a salt; a breaker; a fluid loss control additive; a scale inhibitor; an asphaltene inhibitor; a paraffin inhibitor; a bactericide; a crosslinker; a stabilizer; a chelant; a foaming agent; a defoamer; an emulsifier; a demulsifier; an iron control agent; a solvent; a mutual solvent; a particulate diverter; a gas; carbon dioxide; nitrogen; a biopolymer; a synthetic polymer; a friction reducer; an activator; a retarder; and any combination thereof.

7. The acidic treatment fluid of claim 1 further comprising at least one additional biopolymer selected from the group consisting of: scleroglucan, diutan, any derivative thereof, any clarified version thereof, and any combination thereof.

8. The acidic treatment fluid of claim 1 wherein the acidic treatment fluid comprises a gas in an amount of about 5% to about 95% by volume of the acidic treatment fluid.

9. The acidic treatment fluid of claim 1 wherein the clarified xanthan comprises a xanthan that has a flow rate of at least about 200 ml in 2 minutes at ambient temperature in a filtering laboratory test on a Baroid Filter Press using 40 psi of differential pressure and a 9 cm Whatman filter paper having a 2.7µ pore size.

10. An acidic treatment fluid that comprises an aqueous base fluid, an acid, and a gelling agent comprising clarified xanthan and scleroglucan.

11. The acidic treatment fluid of claim 10 wherein the acid comprises at least one acid selected from the group consisting of: hydrochloric acid; hydrofluoric acid; acetic acid; formic acid; citric acid; lactic acid; glycolic acid; sulfamic acid; any derivative thereof; and any combination thereof 12. The acidic treatment fluid of claim 10 wherein the gelling agent is present in the acidic treatment fluid in an amount of about 1 lb/Mgal to about 200 lb/Mgal.

13. The acidic treatment fluid of claim 10 wherein the gelling agent is at least partially crosslinked through a crosslinking reaction that comprises a crosslinking agent.

14. The acidic treatment fluid of claim 10 further comprising diutan.

15. The acidic treatment fluid of claim 10 further comprising a gas in an amount of about 5% to about 95% by volume.

16. The acidic treatment fluid of claim 10 wherein the clarified xanthan comprises a xanthan that has a flow rate of at least about 200 ml in 2 minutes at ambient temperature in a filtering laboratory test on a Baroid Filter Press using 40 psi of differential pressure and a 9 cm Whatman filter paper having a 2.7µ pore size.

17. A subterranean well treatment system comprising an aqueous base fluid, an acid, and a gelling agent that comprises clarified xanthan.

18. The subterranean well treatment system of claim 17 wherein the acid comprises at least one acid selected from the group consisting of: hydrochloric acid; hydrofluoric acid; acetic acid; formic acid; citric acid; lactic acid; glycolic acid; sulfamic acid; any derivative thereof; and any combination thereof 19. The subterranean well treatment system of claim 17 further comprising at least one additional biopolymer selected from the group consisting of: scleroglucan, diutan, any derivative thereof, any clarified version thereof, and any combination thereof.

20. The subterranean well treatment system of claim 17 wherein the clarified xanthan comprises a xanthan that has a flow rate of at least about 200 ml in 2 minutes at ambient temperature in a filtering laboratory test on a Baroid Filter Press using 40 psi of differential pressure and a 9 cm Whatman filter paper having a 2.7µ pore size.

* * * * *